Patented June 17, 1924.

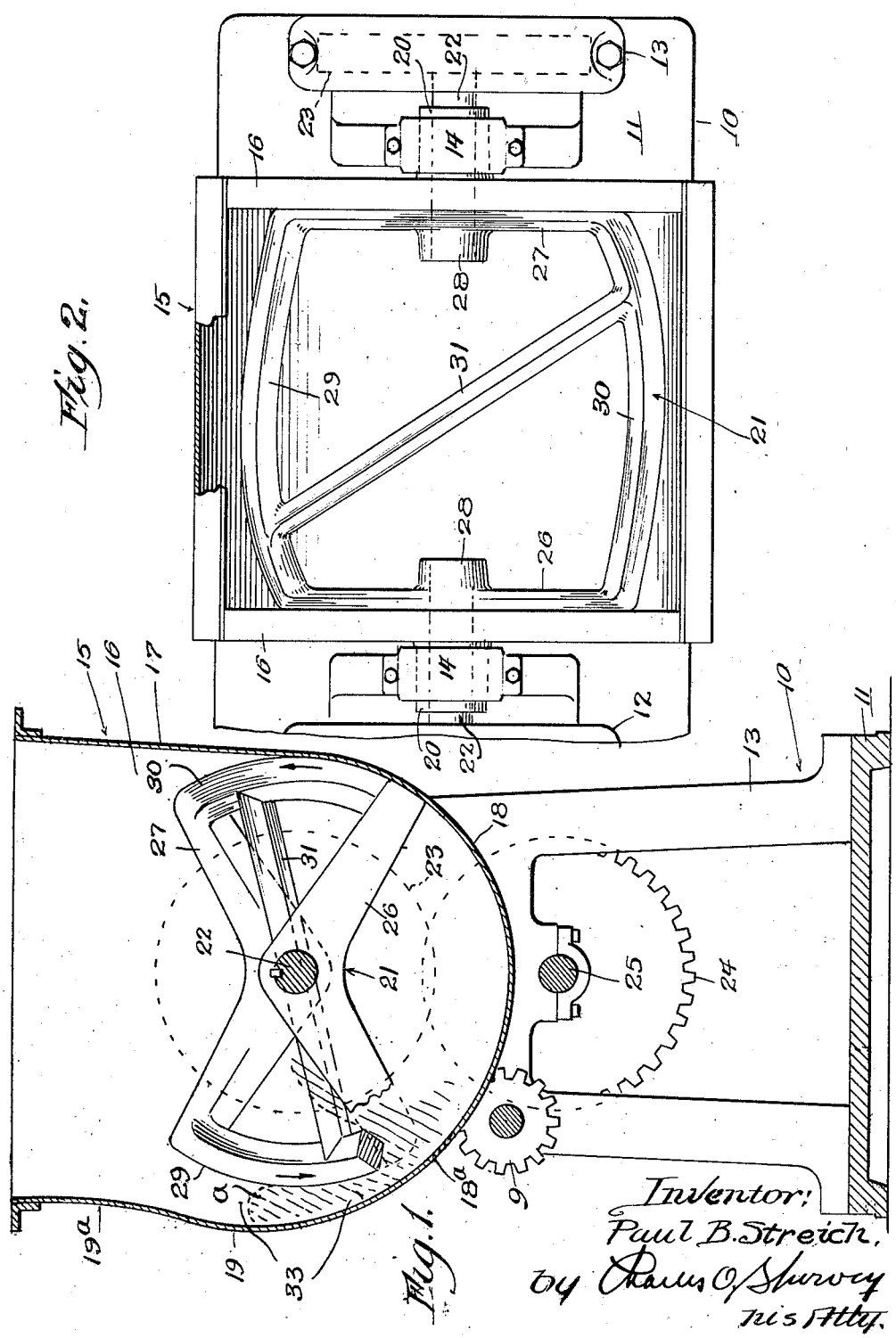

1,497,957

UNITED STATES PATENT OFFICE.

PAUL B. STREICH, OF JOLIET, ILLINOIS, ASSIGNOR TO UNION MACHINERY COMPANY, OF JOLIET, ILLINOIS, A CORPORATION OF ILLINOIS.

DOUGH MIXER.

Application filed September 4, 1923. Serial No. 660,738.

*To all whom it may concern:*

Be it known that I, PAUL B. STREICH, a citizen of the United States, and a resident of Joliet, Will County, Illinois, have invented certain new and useful Improvements in Dough Mixers, of which the following is declared to be a full, clear, and exact description.

This invention relates to dough mixers, and more particularly it relates to the bowl in which the dough is mixed. The principal object of the invention is to produce a more thorough mixing of the dough, to more thoroughly aerate the dough, and to materially reduce the time required for the mixing operation. With these and other objects and advantages in view, this invention consists in the several novel features hereinafter fully set forth and claimed.

The invention is clearly illustrated in the accompanying drawing, in which:

Fig. 1 is a vertical cross-section through a dough mixer embodying a simple form of the present invention, and Fig. 2 is a plan thereof, partly broken away.

Referring to said drawing, which illustrates one embodiment of the present invention, the reference character 10, designates the main frame of the mixer which, as shown, comprises a base 11, and two hollow standards 12, 13, which rise therefrom. On the standards are bearing brackets 14 in which the mixing bowl 15 is rotatively mounted. Means are provided, as usual, for tilting the bowl to discharge its contents, which means include pinions (one of which is shown at 9) that mesh with segmental racks (not shown) on the bowl.

The mixing bowl 15 comprises two heads or ends 16, and front, bottom, and back walls, 17, 18, 18ª, 19, preferably formed of a sheet of metal riveted to the heads or ends 16. The heads 16 are provided with hollow gudgeons 20 which are rotatively mounted in the bearing brackets 14.

In the mixing bowl is an agitator or mixing paddle 21, which is keyed upon stud shafts 22, that are journaled in the gudgeons 20, and project into the hollow standards, where they have gear wheels 23 secured on them, which mesh with other gear wheels 24, mounted on a shaft 25. One of the gear wheels 25 is driven from any suitable drive mechanism, as will be readily understood.

The agitator 21 comprises angle-shaped arms 26, 27 which extend from hubs 28 that are keyed on the shafts 22, and two helical blades 29, 30, which extend from one arm to the other and connect the two. A diagonal blade 31 extends between the two helical blades 29, 30. The two angle-shaped arms 26, 27 are diverse, and each helical blade runs from an end of one arm to an end of the other, as shown. The blades 29, 30 are preferably diamond-shaped in cross-section and contact with certain parts of the bottom of the mixing bowl during rotation of the agitator, as will appear later.

The front wall 17 of the mixing bowl is preferably straight, and at its lower end curves down and back on a line concentric with the common axis of the bowl and agitator, as at 18, to form the front part of the bottom wall of the bowl. Approximately midway between the front and back of the bowl, the curved bottom wall becomes eccentric with respect to the forward part of the bottom wall, and recedes from the normal curve of the forward part so as to leave a space or clearance 33 between the rear portion 18ª of the bottom wall and the agitator blades 29, 30, when the latter are disposed adjacent said rear bottom wall 18ª. The eccentric portion continues upward along the same curve, forming part of the back wall 19 and it may have a reverse curved part 19ª near its upper end. The curve of the bottom and back may be elliptical, if desired, to obtain the clearance between the back wall and agitator blades 29, 30.

In the operation of the mixer, the agitator rotates in the direction indicated by the arrows thereon in Fig. 1, the helical blades passing downward at the eccentric part of the back and bottom wall and passing upward at the front and concentric portion of the bottom wall. Because of the particular shape of the helical blades 29, 30, the dough is forced by one blade, first from one end of the bowl toward the other, and then by the other blade back again toward the end from which it was moved. In passing down, each blade 29, 30 engages the mass of dough at places somewhat distant from the back wall 19, bringing down the dough below the blade, and leaving that part of the batch remaining between the blade and back wall as is illustrated at *a*, in Fig. 1, and that part of the dough falls forward after the passage of the blade, and is encountered in the same manner by the other blade. A more thorough mixing and kneading of the dough is thereby obtained, and a more thorough mixing and aeration of the dough results, and in less time than is ordinarily required.

More or less variation of the exact details of construction is possible without departing from the spirit of this invention; I desire, therefore, not to limit myself to the exact form of the construction shown and described, but intend, in the following claims, to point out all of the invention disclosed herein.

I claim as new and desire to secure by Letters Patent:

1. In a dough mixer, a mixing bowl and a rotary agitator therein having helical blades, said bowl having a curved bottom, part of which is concentric with respect to the axis of rotation of the agitator, and part of which is non-concentric with respect thereto, the non-concentric portion being continued above the axis of the agitator, the helical blades substantially contacting throughout their length, with said concentric part of the curved bottom of the bowl when passing said concentric part.

2. In a dough mixer, a mixing bowl and a rotary agitator therein having helical, peripheral blades, said bowl having a curved bottom and back wall, parts of which are non-concentric with respect to the axis of rotation of the agitator, and part of the curved bottom of the bowl being concentric with the axis of rotation of the agitator, and substantially contacting with the blades of said agitator, throughout their entire length when the latter travel past said concentric part of the bowl.

PAUL B. STREICH.